US006754810B2

(12) United States Patent
Elliott et al.

(10) Patent No.: US 6,754,810 B2
(45) Date of Patent: Jun. 22, 2004

(54) INSTRUCTION SET FOR BI-DIRECTIONAL CONVERSION AND TRANSFER OF INTEGER AND FLOATING POINT DATA

(75) Inventors: Timothy A. Elliott, Austin, TX (US); G. Glenn Henry, Austin, TX (US)

(73) Assignee: I.P.-First, L.L.C., Fremont, CA (US)

( * ) Notice: Subject to any disclaimer, the term of this patent is extended or adjusted under 35 U.S.C. 154(b) by 0 days.

(21) Appl. No.: 10/120,538

(22) Filed: Apr. 10, 2002

(65) Prior Publication Data

US 2002/0133691 A1 Sep. 19, 2002

Related U.S. Application Data

(63) Continuation of application No. 09/866,078, filed on May 25, 2001, now Pat. No. 6,405,306, which is a continuation of application No. 08/980,481, filed on Nov. 29, 1997, now Pat. No. 6,253,311.

(51) Int. Cl.[7] .............................................. G06F 9/315
(52) U.S. Cl. ........................ 712/225; 712/221; 712/222
(58) Field of Search .............................. 708/495; 712/1, 712/2, 3, 4, 221, 222, 223, 225

(56) References Cited

U.S. PATENT DOCUMENTS

| 5,574,928 | A | * | 11/1996 | White et al. ................... 712/23 |
| 5,805,486 | A |   | 9/1998  | Sharanpani |
| 5,864,690 | A |   | 1/1999  | Henry et al. |
| 5,889,984 | A |   | 3/1999  | Mills |
| 6,189,087 | B1 | * | 2/2001 | Witt et al. ................... 712/208 |
| 6,249,798 | B1 |   | 6/2001 | Gulliver et al. |
| 6,405,306 | B2 | * | 6/2002 | Elliott et al. ................ 712/222 |

FOREIGN PATENT DOCUMENTS

WO    WO 97/12317    *   4/1997

OTHER PUBLICATIONS

David L. Weaver & Tom Germond, The SPARC Architecture Manual, Version 9, Menlo Park California, Copy Right 1994.
Michael Slater, A Guide to RISC Microprocessors, pp 159–189, San Diego, CA, Copyright 1992.
Glenford J. Myers & David L. Budde, The 80960 Microprocessor Architecture, chapter 3, pp 74–89 Copyright 1988.
Daniel Tabak, Advanced Microprocessors, Fairfax, VA, Copyright 1991.
Glenford J. Myers & David L. Budde, The 80960 Microprocessor Architecture, Copyright 1988.
Gerry Kane & Joe Heinrich, MIPS RISC Architecture, Upper Saddle River, NJ, Copyright 1992.
MIPS Technologies, MIPS32 Architecture For Programmers, vol. I: Introduction to the MIPS32 Architecture, Copyright 2001.
MIPS Technologies, MIPS64 Architecture For Programmers, vol. II: The MIPS64 Instruction Set, Copyright 2000–2001.
Intel Corporation, i860 64–Bit Microprocessor Programmer's Reference Manual, Copyright 1989.
John Hennessy & David Patterson, Computer Architecture a Quantitative Approach, San Mateo, CA, Copyright 1990.
Intel Corporation, i960 MC Microprocessor Reference Manual, Copyright 1991.
Fuccio, et al., The DSP32C: AT&T's second generation floating point digital signal processor, IEEE Micro, vol. 8, Issue 6 pp. 30–48, 1988.

* cited by examiner

Primary Examiner—William M. Treat
(74) Attorney, Agent, or Firm—James W. Huffman

(57) ABSTRACT

An apparatus and method for bi-directional format conversion and transfer of data between integer and floating point registers is provided. A floating point register is configured to store floating point data, and integer data, in a variety of numerical formats. Data is moved in and out of the floating point register as integer data, and is converted into floating point format as needed. Separate processor instructions are provided for format conversion and data transfer to allow conversion and transfer operations to be separated.

30 Claims, 5 Drawing Sheets

FIG. 1

Formats for Numerical Data

| NAME | LENGTH (BITS) | RANGE | ENCODING | | |
|---|---|---|---|---|---|
| BINARY INTEGERS: | | | | | |
| word integer | 16 | $10^4$ | positives as binary integers negatives in two's complement | | |
| short integer | 32 | $10^9$ | | | |
| long integer | 64 | $10^{18}$ | | | |
| BINARY REAL NUMBERS: | | | sign bits | exponent bits | significand bits |
| single precision | 32 | $10^{\pm 38}$ | 1 | 8 | 23 |
| double precision | 64 | $10^{\pm 308}$ | 1 | 11 | 52 |
| extended precision | 80 | $10^{\pm 4932}$ | 1 | 15 | 64 |

| CONVERSION INSTRUCTIONS | |
|---|---|
| *Floating Point to Integer* | |
| FMXCVT_HF    f1,f3 | converts contents of f3 to 16-bit integer and stores in f1 |
| FMXCVT_WF | converts contents of f3 to 32-bit integer and stores in f1 |
| FMXCVT_LF | converts contents of f3 to 64-bit integer and stores in f1 |
| *Integer to Floating Point* | |
| FMXCVT_FH    f1,f3 | converts contents of f3 from 16-bit integer and stores in f1 |
| FMXCVT_FW | converts contents of f3 from 32-bit integer and stores in f1 |
| FMXCVT_FL | converts contents of f3 from 64-bit integer and stores in f1 |
| MOVE INSTRUCTIONS | |
| *Floating Point to Integer* | |
| FMXMOV_Ix    ir1,f3 | moves contents of fp register f3 into integer register ir1 |
| FMXMOV_IS | single precision format (32-bits into ir1) |
| FMXMOV_ID | double precision format (64-bits into ir1 and ir2) |
| FMXMOV_IE | extended precision significand format (64-bits into ir1, ir2) |
| FMXMOV_IP | extended precision exponent format (16-bits into ir1) |
| FMXMOV_IH | 16-bit integer format (16-bits into ir1) |
| FMXMOV_IW | 32-bit integer format (32-bits into ir1) |
| FMXMOV_IL | 64-bit integer format (64-bits into ir1) |
| FMXMOV_IBS | 8-bit saturated integer format (8-bits into ir1) |
| *Integer to Floating Point* | |
| FMXMOV_Fx    f1,ir1 | moves contents of integer register ir1 into fp register f1 |
| FMXMOV_FS | single precision format (32-bits into f1) |
| FMXMOV_FD | double precision format (64 bits from ir1, ir2 into f1) |
| FMXMOV_FE | extended precision significand format (64 bits into f1) |
| FMXMOV_FP | extended precision exponent format (16 bits into f1) |
| FMXMOV_FH | 16-bit integer format (16-bits into f1) |
| FMXMOV_FW | 32-bit integer format (32-bits into f1) |
| FMXMOV_FL | 64-bit integer format (64-bits into f1) |

INSTRUCTION SET FOR BI-DIRECTIONAL CONVERSION AND TRANSFER OF INTEGER AND FLOATING POINT DATA

CROSS REFERENCE TO RELATED APPLICATIONS

This application is a continuation of U.S. application Ser. No. 09/866,078, filed May 25, 2001, now U.S. Pat. No. 6,405,306, which is a continuation of application Ser. No. 08/980,481 filed Nov. 29, 1997 now U.S. Pat. No. 6,253,311 entitled "INSTRUCTION SET FOR BIDIRECTIONAL CONVERSION AND TRANSFER OF INTEGER AND FLOATING POINT DATA".

BACKGROUND OF THE INVENTION

1. Field of the Invention

This invention relates in general to the field of microprocessors, and more particularly to a method and apparatus for converting and transferring data between floating point and integer registers without first storing the data in memory.

2. Description of the Related Art

One of the fundamental applications of a computer system is the processing and storing of numeric data (sometimes called "number crunching"). To more efficiently perform digital operations on numeric data, scientists and engineers have adopted numerical structures that differ from those used in traditional mathematics. First of all, to perform arithmetic operations, a computer must be capable of storing and retrieving numerical data. The numerical data should ideally be stored in consistent formats designed to minimize space and optimize processing efficiency. Historically, numeric data was stored in structures devised to fit the characteristics of a specific machine. Only recently have common standards been adopted that define mathematical standards for digital computers.

In general, modern computer systems treat numerical data as either integer data or floating point data depending on the application, the size of the number required by the application, and the type of operation to be performed on the data. Because of the difference in data formats between integer data and floating point data, microprocessors typically have two separate processing units, one for processing integer data (the Integer Unit, or IU), the other for processing floating point data (the Floating Point Unit, or FPU). Integer data is operated on by the integer unit within a microprocessor, while floating point data is operated on by the floating point unit within a microprocessor.

Frequently, data is shared by both an integer unit and a floating point unit. When data is shared, it must first be converted into an acceptable form, depending on whether it will be operated upon by the integer unit or the floating point unit. Conversion of data into an acceptable form is typically accomplished as a single operation that converts the data, from integer to floating point, or from floating point to integer, and then stores the converted data into memory.

Thus, before an integer unit can operate on data that is in a floating point unit, the data must first be converted into integer format, and then stored to memory. Alternatively, before a floating point unit can operate on data that is in an integer unit, the data must first be converted into floating point format, and then stored to memory. In modern microprocessors, requiring data to be converted, stored to memory, and then retrieved from memory, is very time consuming for the microprocessor, and adds significant delay in processing the data.

Therefore, what is needed is an apparatus and method that converts numerical data into an acceptable format for either an integer unit, or a floating point unit, without requiring the data to be stored to, and later retrieved from memory. Furthermore, what is needed is a microprocessor that shares data between an integer unit and a floating point unit, and separates the steps of format conversion and data movement.

SUMMARY

To address the above-detailed deficiencies, it is an object of the present invention to provide a method and apparatus for bi-directional transfer of data between a floating point unit and an integer unit, without requiring intermediate storage in system memory.

Accordingly, in the attainment of the aforementioned object, it is a feature of the present invention to provide a microprocessor that includes an integer register file, a floating point register file, and a first conversion instruction. The integer register file is configured to store a plurality of integers. The floating point register file is coupled to the integer register file and is configured to store a plurality of floating point numbers. The floating point register file is also configured to store data in integer format. The first conversion instruction is provided by a translator, or by a control ROM. The first conversion instruction converts a first one of the plurality of floating point numbers within the floating point register file into a first integer and temporarily stores the first integer within the floating point register file.

An advantage of the present invention is that data may be transferred between the integer register file and the floating point register file much faster than the prior art, since the microprocessor does not have to store the converted data in system memory.

Another object of the present invention is to provide a floating point register file that can store either floating point data or integer data.

It is therefore a feature of the present invention to provide a floating point register file within a microprocessor. The floating point register file includes a plurality of floating point registers, and conversion logic. The plurality of floating point registers store floating point numbers in extended precision format. The conversion logic is coupled to the plurality of floating point registers and is configured to convert the floating point numbers into integers, and to store the integers into the plurality of floating point registers. Once the conversion is complete, the integer data can be moved to the integer register file.

An advantage of the present invention is that by allowing the floating point register file to store both floating point data, and integer data, the conversion process can be separated into two distinct steps of converting the data, and moving the data.

It is therefore an object of the present invention to separate data interchange between the floating point register and the integer register into two distinct steps: converting the data, and moving the data.

Another feature of the present invention is to provide a method for transferring data between an integer register file and a floating point register file that does not require intermediate storage of the data in system memory. One method includes retrieving integer data from an integer register file and storing the integer data into a floating point register file. This method further includes converting the stored integer data in the floating point register file into floating point data.

An alternative method includes converting floating point data in a floating point register file into integer data, retrieving the integer data from the floating point register file and storing the integer data into an integer register file. Depending on which method is used, data can either begin as integer data in the integer register, and can be moved to the floating point register and converted. Or, data can begin as floating point data in the floating point register, and can be converted and moved to the integer register.

An advantage of this invention is that data conversion and movement between an integer unit and a floating point unit can be rapidly performed without requiring intermediate storage in system memory.

A further advantage of the present invention is that since the steps of conversion and movement are distinct, other instructions may be placed between the steps of conversion and movement, to eliminate dependency stalls in the pipeline of a microprocessor.

BRIEF DESCRIPTION OF THE DRAWINGS

These and other objects, features, and advantages of the present invention will become better understood with regard to the following description, and accompanying drawings where:

FIG. 1 is a table illustrating floating point data formats for numerical data.

FIG. 4 is a table illustrating the data conversion and move instructions according to the present invention.

DETAILED DESCRIPTION

Referring to FIG. 1, a table 100 is provided that illustrates common formats for numerical data within a microprocessor system. The table is divided into two parts, one associated with Binary Integers, the other associated with Binary Real Numbers.

Integer numbers are typically stored in one of three formats that have identical structure but different capacity. The word integer format occupies two bytes (16-bits), the short integer format takes up a double word (32-bits), and the long integer format a quadword (64-bits). In all three formats the most significant bit encodes the sign of the number. Generally, a sign bit of 1 represents a negative number and a sign bit of 0 a positive number. Positive numbers are stored in pure binary form. Negative numbers are represented as two's complement form.

The term Real Number, on the other hand, is typically used to designate a number than can be represented in signed, floating point form. Table 100 shows three floating point encodings for binary real numbers. All three real number formats have the following fields: a sign bit field, an exponent field, and a significand field. The sign bit field, which is the most significant bit in the encoding, represents the sign of the number. A 1-bit in the sign field indicates a negative number and a 0-bit indicates a positive number. The exponent field encodes the position of the significand's binary point. The exponent encoding is in bias form. Therefore, if the absolute value of the exponent is less than the bias, then the exponent is negative. This eliminates the need to store the sign of the exponent. An exponent smaller than the bias is in the negative range. An exponent larger than the bias is in the positive range. The exponent is zero if it is equal to the bias. The significand field encodes the number's significant digits as a binary fraction. Normal numbers have an exponent in the range of 11 . . . 10 to 00 . . . 01 and the significand is a binary fraction in the form 1.xx . . . xx. The number of digits in the fractional part of the significand changes in the different formats. The integer digit of the significand is implicit in the single and double precision formats but is explicitly coded in the extended precision format.

As mentioned in the Background above, binary integers are operated on by an integer unit, and binary real numbers are operated on by a floating point unit. The integer unit may store data in its integer register file in any of the three integer formats shown in table 100. However, the floating point unit, even though it reads and writes data in any of the three real number formats, always stores data within its floating point register file, in 80-bit extended precision format. Numbers encoded in the remaining formats, typically exist only in memory. Thus, when a number is loaded from memory into a floating point register file, it is automatically converted into the extended precision format.

Figure 2:
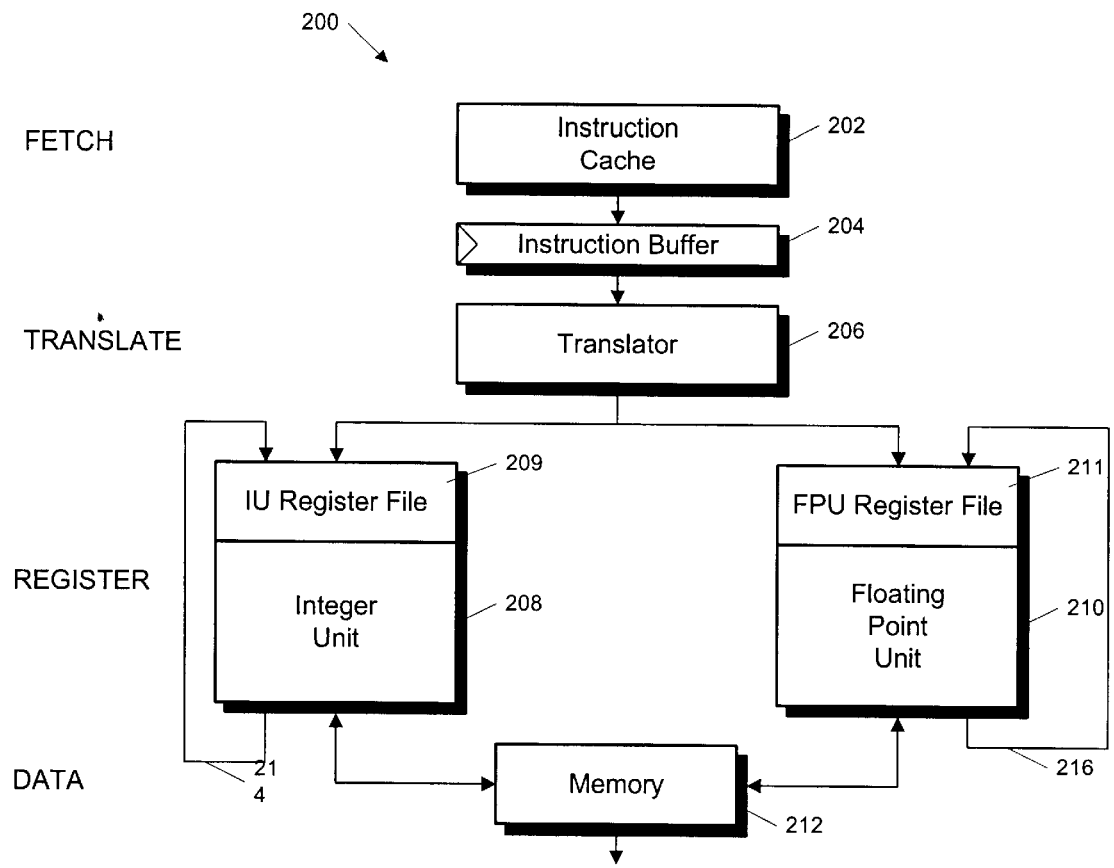
FIG. 2 is a block diagram of a portion of a microprocessor that transfers data between floating point and integer register files via memory.

With the above overview of numeric formats within computer systems, a more detailed description of the problem to which the present invention is directed will be provided with reference to FIG. 2.

FIG. 2 contains a portion of a pipeline microprocessor 200. The microprocessor 200 contains an instruction cache 202 for temporarily storing instructions to be executed by the microprocessor. The instructions stored by the instruction cache 202 can be either integer instructions, or floating point instructions. During the Fetch stage of the microprocessor 200, an instruction is fetched from the instruction cache 202 and provided to an instruction buffer 204. The instruction buffer 204 provides temporary storage for one or more instructions that are to be translated and executed by following stages in the pipeline.

The instruction buffer 204 provides instructions, to a translator 206 during a translate stage of the pipeline. The translator 206 translates, or decodes, the integer or floating point instructions into micro operations that can be executed by either an integer unit 208 or a floating point unit 210. If the translated instructions operate on integer data, they are provided to the integer unit 208. If the translated instructions operate on floating point data, they are provided to the floating point unit 210.

During the Register stage of the pipeline, either the integer unit 208 or the floating point unit 210 retrieves data specified by translated instructions from the IU register file 209 or the FPU register file 211, respectively. The numeric data in the IU register file 209 is stored in 16, 32 or 64-bit integer format. The data stored in the FPU register file is stored in 80-bit extended precision format. The specified data is retrieved from the appropriate register file and is provided to the IU 208 or the FPU 210 for operation. The result of the operation is either stored back into the IU register file 209, via bus 214, or the FPU register file 211, via bus 216, or is written into memory 212. One skilled in the art will appreciate that although portions of the memory 212 may be cached within the microprocessor 200, the memory 212 indicated is external to the microprocessor 200. Thus, when either the IU 208 or the FPU 210 needs to write data to, or read data from the memory 212, the microprocessor 200 delays processing until the memory 212 can respond.

In the prior art, if data resides in the FPU register file 211 (in extended precision format), and it is needed by the integer unit 208, a programmer is required to first execute an instruction that converts the data in the FPU register file 211 into the desired integer format, and then stores the converted data into the memory 212.

Within an x86 microprocessor, the instruction that performs this conversion/move operation is the FIST instruction. The FIST instruction converts the value stored in a floating point register ST into a signed integer according to the rounding control specified in a floating point control word. The FIST instruction then transfers the result to a memory destination in the memory 212 that is specified by the instruction. The FIST instruction, within the Pentium microprocessor manufactured by Intel Corporation, requires 6 clock cycles to perform the conversion and transfer. After the data is stored into the memory 212, if it is desired by the integer unit 208, it is then retrieved from the memory 212. An instruction that performs the retrieval is the MOV instruction. The MOV instruction retrieves the converted data and stores it into the IU register file 209. As mentioned above, the process of storing the converted data into the memory 212, and then retrieving the data from the memory 212 adds significant delay in processing the data. In the case of the Pentium microprocessor, at least 7 clock cycles are required to convert and move a single datum from the FPU register file 211 to the IU register file 209.

Alternatively, if the FPU 210 requires data that is in the IU register file 209, a programmer must first execute an instruction that moves the integer data from the IU register file 209 to the memory 212. This instruction is the MOV instruction, and typically requires a single clock cycle. The programmer must then execute an instruction that retrieves the data from the memory 212, and converts the data to the correct floating point format, before storing the data into the FPU register file 211. An instruction for performing the retrieval and conversion is FILD. This instruction converts the source operand in the memory 212 into extended precision floating point format, and pushes it into the FPU register file 211. The FILD instruction typically requires 3 clock cycles. So, if the FPU register file 211 requires a single datum from the IU register file 209, at least 4 clock cycles are required.

Both of the above scenarios presume that the microprocessor 200 can access the memory 212 immediately. It is possible, however, in a multi-master environment that the microprocessor 200 may have to wait longer than is specified above to access the memory 212, thus adding further delay to the process. Moreover, if multiple pieces of data are required to be shifted between the IU register file 209 and the FPU register file 211, the problem of delay is exacerbated.

Figure 3:
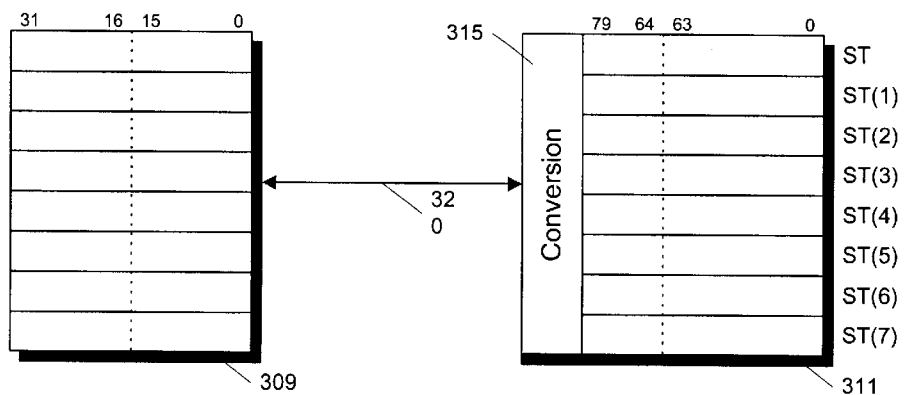
FIG. 3 is a block diagram of the integer and floating point register files illustrated in FIG. 2.

Now referring to FIG. 3, a portion of a microprocessor 300, according to the present invention is provided. Specifically, the portions that are shown are an integer register file 309 and a floating point register file 311. The integer register file 309 contains a plurality of 32-bit registers for storing either 16 or 32-bit integers. The floating point register file 311 contains a plurality of 80-bit registers for storing floating point data in extended precision format. In addition, the floating point register file 311 is configured to allow 16, 32 or 64 bit integers to be stored. In one embodiment, the 16, 32 or 64 bit integers are stored into bits 0–63, typically associated with the significand. With the floating point register 311 configured to store integer values, the floating point register 311 can be used as intermediate storage of data between the integer register file 309 and the floating point register 311, without requiring data to be stored in an external memory. Transfer between the integer register file 309 and the floating point register file 311 is accomplished using a bus 320. One skilled in the art will appreciate that the bus 320 is illustrative only. In a pipeline microprocessor, both the integer register file 309 and the floating point register file 311 have multiple read/write ports that are accessed during a register stage and/or a write back stage.

Also located within the register file 311 is conversion logic 315. The purpose of the conversion logic 315 is to convert data within the floating point register file 311 into a desired format. The conversion logic 315 can convert extended precision floating point data into 16, 32 or 64 bit integer data, or vice versa. The methods for bi-directionally converting and moving data between the integer register file 309 and the floating point register file 311 will be further described below with reference to FIGS. 6, 7.

Now referring to FIG. 4, a table 400 is shown illustrating an instruction set according to the present invention for converting data between floating point and integer formats, and for moving data between a floating point register file and an integer register file. The table 400 is separated into conversion instructions and move instructions.

The Conversion instructions are of two types: 1) Floating point to Integer (FMXCVT_xF); and 2) Integer to Floating Point (FMXCVT_Fx). The FMXCVT_xF instruction converts the contents of a floating point register (in 80-bit: extended precision format) into an integer format of either 16, 32 or 64 bit, depending on the form of the instruction, and stores the result back into the floating point register file. The FMXCVT_Fx instruction converts the contents of a floating point register (in 16, 32 or 64-bit format) into extended precision format, and stores the result back into the floating point register file.

The Move instructions are also of two types: 1) Move from Floating point register file to Integer register file; and 2) Move from Integer register file to Floating point register file. The Floating Point to Integer instructions allow a programmer to specify the form of the data to be moved into the integer register file. For example, if the data to be moved is in 32-bit integer format, a programmer would specify the instruction FMXMOV_IL.

Alternatively, the Integer to Floating point instructions move the contents of an integer register into a floating point register, according to the format specified by the instruction. For example, if the data to be moved is a 64-bit integer, the programmer would use the FMXMOV_FL instruction. In one embodiment, since the integer register file contains 32-bit registers, a 64-bit move, to or from the integer register file, writes or reads the first 32-bits from the integer register specified by the move instruction, and reads or writes the second 32-bits from the next integer register following that specified by the instruction.

In view of the above, operation of the present invention will now be described with reference to FIGS. 5–7.

Figure 5:
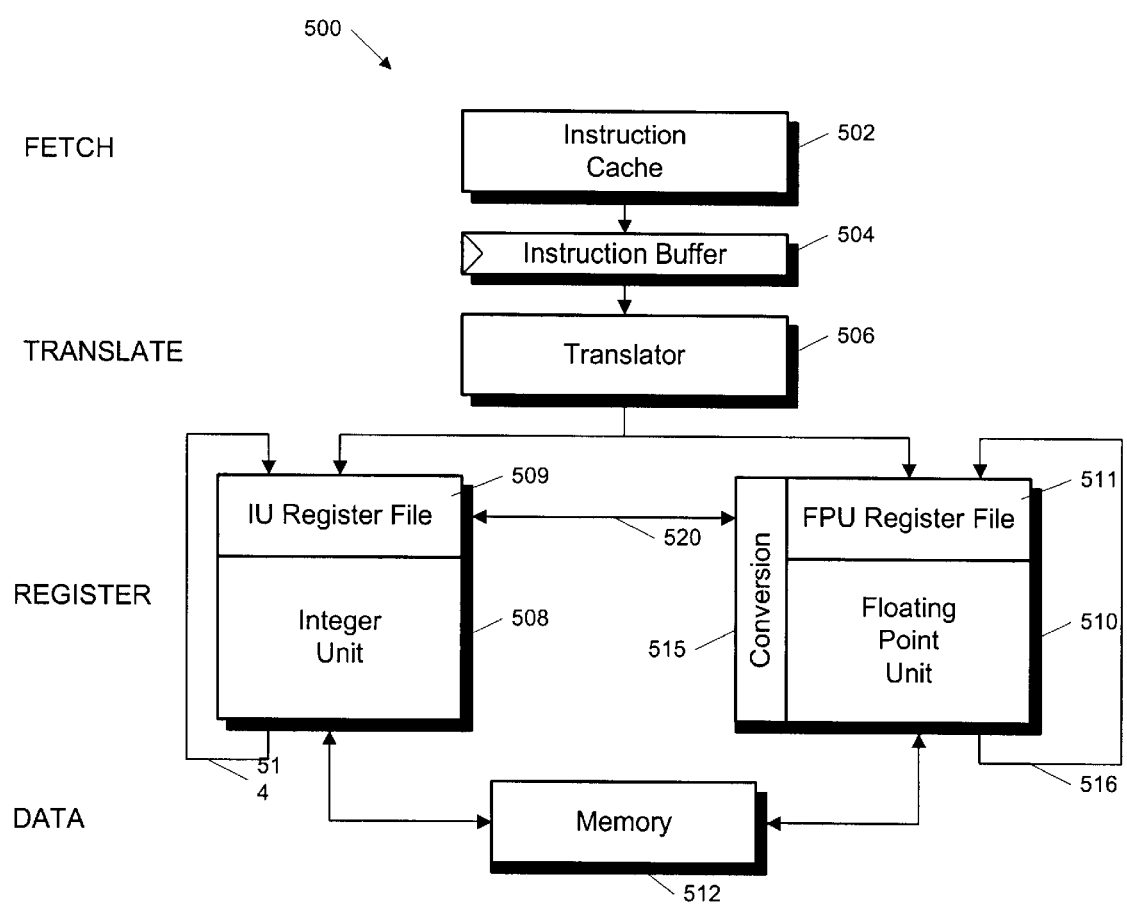
FIG. 5 is a portion of the microprocessor according to the present invention for converting and moving data between integer and floating point register files, without requiring intermediate storage in memory.

Referring first to FIG. 5, a portion of a pipeline microprocessor 500, incorporating the present invention, is shown. The microprocessor includes similar stages and elements, as described above with reference to FIG. 2, but incorporates the register files described below with reference to FIG. 3. Like elements have like numbers, with the hundreds digit replaced by 5.

In operation, if the IU 508 requires data located within the FPU register file 511, a programmer can execute two instructions, according to the formats described above with reference to FIG. 4. The first instruction is of the form FMXCVT_xF to convert the floating point number into an integer, and restore the integer into the FPU register file 511. The second instruction is of the form FMXMOV_lx to move the converted datum to the designated register within the IU register file 509. It should be appreciated that neither of these instructions required the microprocessor 500 to access the memory 512, either to store the converted data, or to retrieve the converted data. Thus, in many instances, the instructions that convert the data and move the data can be performed within a single clock cycle.

Moreover, since the FPU register file 511 is capable of storing data in integer format, the move instructions and the convert instructions may be separated in time. This allows a programmer to insert other instructions into the pipeline between the move and convert operations, either to prevent stalls associated with interlock dependencies, or to perform multiple moves or conversions, back to back.

The methodology for allowing the FPU register file 511 to access data in the IU register file 509 is similar to that described above. However, rather than performing the conversion first, a programmer first moves the desired data from the IU register file 509 into the FPU register file 511. The programmer then converts the data into floating point format, according to whether the data moved was in 16, 32 or 64-bit integer format. Again, since the move and convert operations are distinct, they need not follow each other directly. Rather, other instructions can be inserted between the move and convert operations, as described above.

Figure 6:
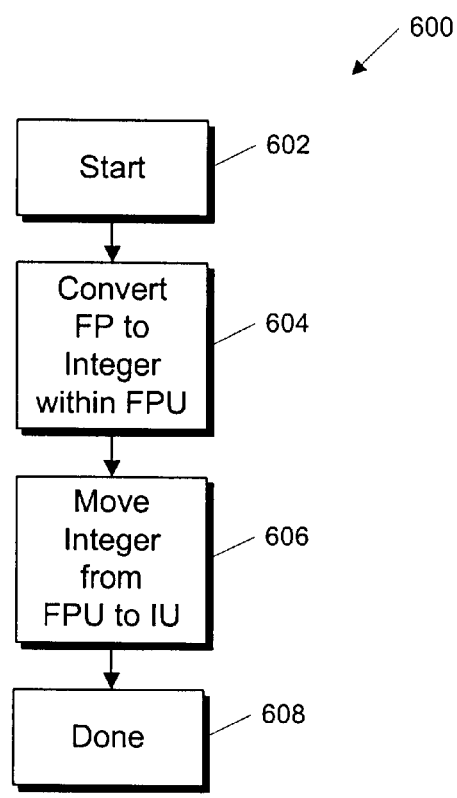
FIG. 6 is a flow chart illustrating conversion of floating point data into an integer format, and transfer of the converted data from a floating point register into an integer register.

Now referring to FIG. 6, a flow chart 600 is provided that illustrates the method of the present invention for moving data from a FPU to an IU. The process begins at step 602 and proceeds to step 604.

At step 604, the data to be moved is converted from extended precision floating point format to the desired integer format, and is stored back into the floating point register file. Flow then proceeds to step 606.

At step 606, the converted data is moved from the floating point register file into the integer register file, as specified by a move instruction. Flow then proceeds to block 608 where the conversion/move process is complete.

Figure 7:
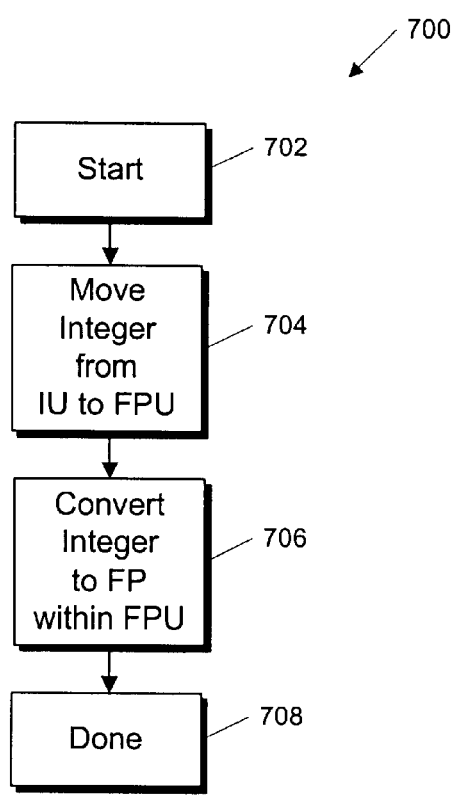
FIG. 7 is a flow chart illustrating transfer of integer data from an integer register into a floating point register, and conversion of the integer data into floating point format.

Referring to FIG. 7, a flow chart 700 is provided that illustrates the method of the present invention for moving data from an IU to a FPU. The process begins at step 702 and proceeds to step 704.

At step 704, the desired data is moved from the integer register file to the floating point register file. Flow then proceeds to step 706.

At step 706, the moved data is converted from integer format into extended precision floating point format. As explained above, the data will be converted according to the convert instruction specified by the programmer. After the data is converted, flow proceeds to block 708 where the process is complete.

Thus, whether data is located within an integer register or a floating point register, or whether the data is in a floating point format or an integer format, the present invention allows a programmer to convert the data into a desired format, and move the data bi-directionally between the integer register file and the floating point register file, without requiring a microprocessor to perform a bus access to external memory.

Although the present invention and its objects, features, and advantages have been described in detail, other embodiments are encompassed by the invention. For example, the conversion logic described above has been illustrated in connection with the floating point register file. It is possible that the conversion logic could be located either with the integer register file, or in another portion of the microprocessor. Moreover, although the floating point register file has been used to store integer values, this selection was made because the typical size of floating point registers allows storage of 64-bit integers. However, in future processors, it may be desirable to allow data in floating point format to be temporarily stored in the integer register file. Whether the converted data is temporarily stored in the floating point register file, or the integer register file, or whether the conversion logic is coupled to either of the register files, is not of concern. Rather, it is the bi-directional transfer between register files, without requiring access to external memory, and the separation of the conversion and move operations, that provides the advantages of the present invention.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor for executing macro instructions, including MOVE macro instructions and CONVERT macro instructions, comprising:
   an instruction buffer, for holding the MOVE and CONVERT macro instructions;
   a translator, coupled to said instruction buffer, for receiving the MOVE and CONVERT macro instructions and for translating the MOVE and CONVERT macro instructions into MOVE and CONVERT micro instructions, respectively;
   a first register file, for storing data in integer format;
   a second register file, for storing data in floating point format and in integer format;
   conversion logic, coupled to said second register file, for converting data in said second register file from floating point format to integer format upon execution of said CONVERT micro instructions; and
   a bus, coupling said first register file to said second register file, to allow data stored in integer format within said second register file to be transferred from said second register file to said first register file, without requiring transfer to external memory, upon execution of said MOVE micro instruction.

2. The microprocessor as recited in claim 1 wherein the macro instructions are x86 compatible macro instructions.

3. The microprocessor as recited in claim 1 wherein each of the macro instructions are translated by said translator into one or more micro instructions.

4. The microprocessor as recited in claim 1 wherein said instruction buffer holds one or more of the macro instructions.

5. The microprocessor as recited in claim 1 wherein said first register file is utilized by a first pipeline within the microprocessor which operates on data stored in integer format.

6. The microprocessor as recited in claim 1 wherein said second register file is utilized by a second pipeline within the microprocessor which operates on data stored in floating point format.

7. The microprocessor as recited in claim 1 wherein said integer format comprises data in word integer format of sixteen bits.

8. The microprocessor as recited in claim 1 wherein said integer format comprises data in short integer format of thirty-two bits.

9. The microprocessor as recited in claim 1 wherein said integer format comprises data in long integer format of sixty-four bits.

10. The microprocessor as recited in claim 1 wherein said floating point format comprises data in single precision format of thirty-two bits.

11. The microprocessor as recited in claim 1 wherein said floating point format comprises data in double precision format of sixty-four bits.

12. The microprocessor as recited in claim 1 wherein said floating point format comprises data in extended precision format of eighty bits.

13. The microprocessor as recited in claim 1 wherein said second register file comprises a plurality of registers, each of which can store data in either integer format or floating point format.

14. The microprocessor as recited in claim 1 wherein before data is transferred over said bus from said second register file to said first register file, it is first converted by said conversion logic into integer format.

15. A pipelined microprocessor having at least two pipeline stages, a first stage for operating on data stored in integer format, and a second stage for operating on data stored in floating point format, the pipelined microprocessor comprising:

a translator, for receiving macro instructions, said translator translating said macro instructions into first micro instructions for execution by the first stage, or second micro instructions for execution by the second stage;

a first register file, coupled to the first stage, for storing data in integer format;

a second register file, coupled to the second stage, for storing data in integer format and in floating point format;

a bus, coupling said first register file and said second register file, to allow data stored in integer format to be transferred from said second register file to said first register file.

16. The pipelined microprocessor as recited in claim 15 wherein said macro instructions are directed to either the first stage or the second stage of the microprocessor.

17. The pipelined microprocessor as recited in claim 16 wherein said macro instructions that are directed to the second stage comprise:

a first convert macro instruction, for causing said second stage to convert data stored in said second register file from floating point format to integer format.

18. The pipelined microprocessor as recited in claim 16 wherein said macro instructions that are directed to the second stage comprise:

a second convert macro instruction, for causing said second stage to convert data stored in said second register file from integer format to floating point format.

19. The pipelined microprocessor as recited in claim 16 wherein said macro instructions that are directed to the second stage comprise:

a first move macro instruction, for causing said second stage to move data stored in integer format in said second register file to said first register file.

20. The pipelined microprocessor as recited in claim 15 further comprising:

conversion logic, coupled to said second register file, for converting data stored in said second register file from integer format to floating point format.

21. The pipelined microprocessor as recited in claim 15 further comprising:

conversion logic, coupled to said second register file, for converting data stored in said second register file from floating point format to integer format.

22. A method within a microprocessor for transferring data between a first register file which stores data in integer format and a second register file which stores data in both integer format and floating point format, the method comprising:

providing the first register file within a first execution unit within the microprocessor;

providing the second register file within a second execution unit within the microprocessor;

coupling the first register file to the second register file to allow data stored in integer format within the second register file to be transferred to the first register file; and upon receipt of a move macro instruction by the microprocessor, translating the move macro instruction into a move micro instruction which transfers data specified by the move macro instruction from the second register file to the first register file; and providing the move micro instruction to the second execution unit to accomplish the transfer.

23. The method as recited in claim 22 wherein said coupling is provided for by a bus that connects the first register file to the second register file.

24. The method as recited in claim 22 wherein said step of translating is performed by a translator.

25. The method as recited in claim 22 further comprising:

before transferring data specified by the move macro instruction from the second register file to the first register file, converting the data from floating point format into integer format.

26. The method as recited in claim 25 wherein said step of converting stores the converted data into the second register file.

27. A method for converting data within a second register file from floating point format to integer format and for moving the converted data to a first register file, the method comprising:

receiving a CONVERT macro instruction specifying data to be converted from floating point format to integer format;

translating the CONVERT macro instruction into a CONVERT micro instruction;

executing the CONVERT micro instruction to convert the specified data from floating point format to integer format, said step of executing comprising:
reading the specified data in floating point format from the second register file;
converting the specified data from floating point format to integer format; and
storing the converted data into the second register file; and receiving a MOVE macro instruction specifying data to be moved from the second register file to the first register file;

translating the MOVE macro instruction into a MOVE micro instruction;

executing the MOVE micro instruction to move the specified data from the second register file to the first register file without requiring transfer to external memory.

28. The method of claim 27 wherein after said step of executing, the converted data is transferred to a first register file.

29. The method of claim 28 wherein the first register file stores data in integer format.

30. The method of claim 27 wherein the second register file stores data in integer format and floating point format.

* * * * *